United States Patent
Yoshikawa (10) Patent No.: US 11,575,768 B2
(45) Date of Patent: Feb. 7, 2023

(54) COMMUNICATION APPARATUS CAPABLE OF NOTIFYING A CLIENT APPARATUS, CONTROL METHOD THEREOF, AND MEDIUM

(71) Applicant: CANON KABUSHIKI KAISHA, Tokyo (JP)

(72) Inventor: Yuki Yoshikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/502,207

(22) Filed: Jul. 3, 2019

(65) Prior Publication Data
US 2019/0342416 A1    Nov. 7, 2019

Related U.S. Application Data

(63) Continuation of application No. PCT/JP2017/041819, filed on Nov. 21, 2017.

(30) Foreign Application Priority Data

Jan. 10, 2017   (JP) .............................. JP2017-002118

(51) Int. Cl.
*H04L 67/56*    (2022.01)
*H04L 67/60*    (2022.01)
*H04W 84/12*    (2009.01)

(52) U.S. Cl.
CPC .............. *H04L 67/56* (2022.05); *H04L 67/60* (2022.05); *H04W 84/12* (2013.01)

(58) Field of Classification Search
CPC ..... H04L 67/28; H04L 67/32; H04L 67/2876; H04L 67/16; H04W 84/12; H04W 84/18; H04W 8/005; H04W 4/06; H04W 52/02
See application file for complete search history.

(56) References Cited

U.S. PATENT DOCUMENTS

2009/0138713 A1*  5/2009  Veillette .............. H04L 67/2814
                                                              713/171
2013/0237259 A1   9/2013  Umehara
(Continued)

FOREIGN PATENT DOCUMENTS

JP    2013187703 A    9/2013
WO    2015038272 A1   3/2015
(Continued)

OTHER PUBLICATIONS

International Search Report issued in parent International Application No. PCT/JP2017/041819 dated Feb. 13, 2018.

*Primary Examiner* — Jackie Zuniga Abad
(74) *Attorney, Agent, or Firm* — Venable LLP (57) ABSTRACT

A communication apparatus can act as a proxy to perform communication with a plurality of other communication apparatuses by receiving a request from a client apparatus in a network in compliance with the Neighbor Awareness Networking standard, and includes a first reception unit configured to receive, from a first other communication apparatus, a first signal for service provision notification, a second reception unit configured to receive, from the first other communication apparatus, a second signal for service provision notification, and a third reception unit configured to receive, from a second other communication apparatus, a third signal for service provision notification. In addition, a notification unit notifies the client apparatus of information related to the first other communication apparatus and information related to the second other communication apparatus together in a case where the first signal, the second signal, and third signal are received.

11 Claims, 7 Drawing Sheets

(56) References Cited

U.S. PATENT DOCUMENTS

| | | |
|---|---|---|
| 2015/0036540 A1 | 2/2015 | Kasslin et al. |
| 2015/0081840 A1 | 3/2015 | Patil et al. |
| 2016/0127996 A1 | 5/2016 | Patil et al. |
| 2017/0093479 A1* | 3/2017 | Mogi ................ H04W 4/00 |
| 2019/0028875 A1 | 1/2019 | Yoshikawa |

FOREIGN PATENT DOCUMENTS

| | | |
|---|---|---|
| WO | 2016069372 A1 | 5/2016 |
| WO | 2016113775 A1 | 7/2016 |

\* cited by examiner

COMMUNICATION APPARATUS CAPABLE OF NOTIFYING A CLIENT APPARATUS, CONTROL METHOD THEREOF, AND MEDIUM

CROSS-REFERENCE TO RELATED APPLICATIONS

This application is a Continuation of International Patent Application No. PCT/JP2017/041819, filed Nov. 21, 2017, which claims the benefit of Japanese Patent Application No. 2017-002118, filed Jan. 10, 2017, both of which are hereby incorporated by reference herein in their entirety.

BACKGROUND OF THE INVENTION

Field of the Invention

The present invention relates to a communication apparatus, a control method thereof, and a medium.

Background Art

In recent years, a wireless LAN (Local Area Network) represented by the IEEE802.11 standard series is widely used. In many cases, a network is controlled by a base station called an access point (AP) in a wireless LAN. A wireless network is formed by the AP and stations (STAs) which fall within the radio wave coverage of the AP and are in a wirelessly connected state.

In addition to a simple wireless network arrangement formed by an AP and STAs in this conventional manner, various kinds of wireless LAN network mode products and specification standards have appeared. PTL 1 discloses NAN (Neighbor Awareness Networking) which is a standard that has been defined by the Wi-Fi alliance so that another apparatus can discover an executable service. According to PTL 1, in NAN, each apparatus communicates information of a service in a period determined based on a beacon signal. Since each apparatus executes communication in a predetermined period and is set to a sleep state in which wireless communication is not executed in other periods, it allows the other apparatuses to efficiently discover an executable service.

There is proposed a method in which an apparatus can discover a service of and, on the other hand, be discovered by a communication apparatus that is present in a range that cannot be covered by a self wireless signal by making a request (to be referred to as a proxy hereinafter) to the other communication apparatus to search for or to provide a service (PTL 2). According to this proposal, for example, a request-issuing-side communication apparatus (to be referred to as a proxy client hereinafter) makes a request to a request-receiving-side communication apparatus (to be referred to as a proxy server hereinafter) to search for a desired service. Then, in response to the service inquiry from another communication apparatus, the proxy server notifies the proxy client of a service matching the contents (for example, the name of the service) of the requested service. As a result, the proxy client can discover the desired service.

CITATION LIST

Patent Literature

PTL 1: U.S. Patent Application Publication No. 2015/0036540

PTL 2: U.S. Patent Application Publication No. 2015/0081840

SUMMARY OF THE INVENTION

In this manner, in the technique described above, when the name of the requested service matches the name of the service inquired by the other apparatus, the proxy server will transmit the information of the service and the other communication apparatus to the proxy client. Although such a procedure allows the proxy client to discover the desired service efficiently, the proxy server may transmit the same information related to the other communication apparatus to the proxy client a plurality of times. That is, the proxy client may be notified of information more than necessary.

The present invention provides, in consideration of the above problem, a solution to appropriately determine the information to be transmitted to notify an apparatus which is to be requested to act as a proxy.

A communication apparatus according an embodiment of the present invention includes the following arrangement. That is, a communication apparatus that can act as a proxy to perform communication with a plurality of other communication apparatuses by receiving a request from a client apparatus in a network in compliance with the Neighbor Awareness Networking standard, the apparatus comprising: a reception unit configured to receive, from each of the plurality of other apparatuses, a signal for service provision notification in a predetermined time period which arrives at a predetermined interval; a determination unit configured to determine whether to notify the client apparatus of information related to another communication apparatus which is a transmission source of the signal; and a notification unit configured to notify the client apparatus of the information related to the other communication apparatus in the predetermined time period if the determination unit determines that the client apparatus is to be notified.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

An example using a wireless LAN communication system in compliance with the NAN standard will be described hereinafter. In NAN, information of a service is communicated during a period called a Discovery Window (to be referred to as DW hereinafter). The DW is the time and channel at which devices (to be referred to as NAN devices hereinafter) that are to execute communication in compliance with the NAN standard converge. The DW is a time period in which 16 DW periods from DW0 to DW15 are defined as one cycle, and a DW period after 16 periods from DWn (n is an integer within the range of 0 to 15) will also be DWn. A single DW period includes a period of 16 TU (Time Units). Note that 1 TU is 1,024 µsec. In addition, each DW period occurs at an interval of 512 TU.

A set of a plurality of NAN devices sharing a DW schedule is called a NAN cluster. That is, a unique DW schedule is determined for each NAN cluster. The frequency at which a NAN device receives a wireless signal during the DW period depends on each NAN device. However, all of the NAN devices participating in the NAN cluster need to be in a state (to be referred to as an "awake state" hereinafter) in which a wireless signal can be received in a special DW period. According to the NAN standard, the special DW period is DW0 which is a DW period that arrives once every cycle of 16 DW periods. In addition, DW0 is a DW period which starts from a time at which the lower 23 bits of the TSF (Time Synchronization Function), which is a counter timer used for synchronization by the NAN cluster, are 0×0.

Each NAN device belonging to the NAN cluster operates in one of the roles of a master, a non-master sync, and a non-master non-sync. A NAN device that operates in the role of a master transmits a synchronization beacon (to be referred to as a "sync beacon" hereinafter) which is a beacon for the NAN devices of the NAN cluster to which it belongs to identify and synchronize with the DW. The NAN device that is to operate in the role of the master also transmits a discovery beacon which is a signal to allow a device (terminal) not belonging to the NAN cluster to recognize the NAN cluster. The discovery beacon is transmitted, for example, every 100 ms in a period outside the DW. Note that in each NAN cluster, at least one NAN device will operate in the role of a master. A NAN device that operates in the role of a non-master sync will transmit a sync beacon, but will not transmit a discovery beacon. In addition, a NAN device that operates in the role of a non-master non-sync will not transmit the sync beacon or the discovery beacon.

NAN devices participating in a NAN cluster can, in accordance with a received sync beacon, synchronize with a DW period which comes every predetermined cycle and execute communication related to the information of the service in the DW period. However, each NAN device operating in the role of the non-master non-sync need not execute communication in every DW.

The NAN devices communicate, to each other, a subscribe message which is a signal for discovering or requesting a service and a publish message which is a signal for transmitting a notification of a provision of a service. Furthermore, the NAN devices can exchange follow-up messages to exchange additional information related to a service in the DW period. Note that messages such as the publish message, the subscribe message, and the follow-up message will be collectively referred to as a service discovery frame (SDF). The NAN devices can exchange SDFs to advertise or detect a service. Note that in the following description, a NAN device that transmits a subscribe message which is a service search request message for searching for a service provided by another NAN device will be referred to as a subscriber. In addition, a NAN device that transmits a publish message which is a service providing message for providing a service will be referred to as a publisher.

Figure 1:
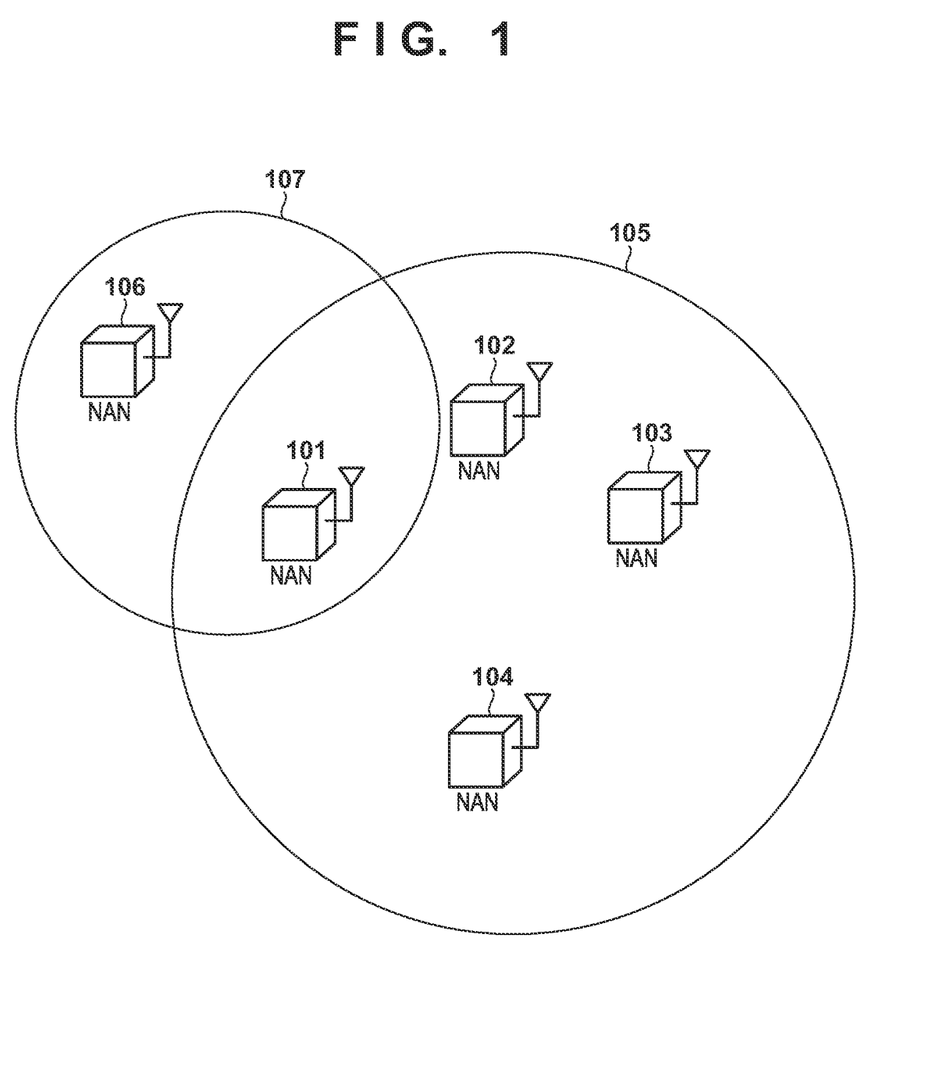
FIG. 1 is a view showing the arrangement of a communication system.

FIG. 1 shows an example of the network arrangement that is to be the premise of an embodiment to be described hereinafter. NAN devices 101 to 104 and 106 are communication apparatuses that perform communication in compliance with the NAN standard. Based on the NAN standard, each of the NAN devices 101 to 104 and 106 can discover a service provided by another NAN device and provide a service to the other NAN device. The NAN devices 101 to 104 participate in a NAN cluster 105. Also, the NAN devices 101 and 106 participate in a NAN cluster 107. Each of the NAN devices 101 to 104 participating in the NAN cluster 105 performs communication by using channel 6 (2.437 GHz) in the 2.4 GHz frequency band. The NAN devices 101 and 106 participating in a NAN cluster 107 perform communication by using, for example, channel 44 (5.220 GHz) which is a frequency band different from that of the NAN cluster 105.

Figure 2A:
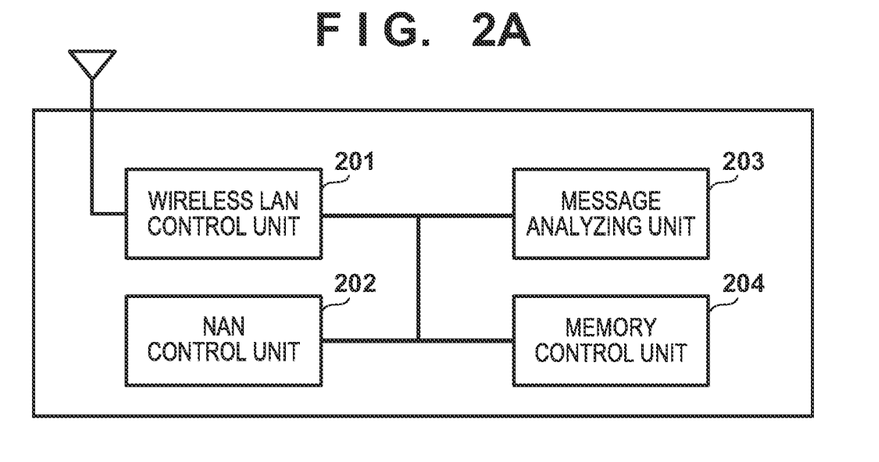
FIG. 2A is an example of the functional arrangement of a NAN device.
Figure 2B:
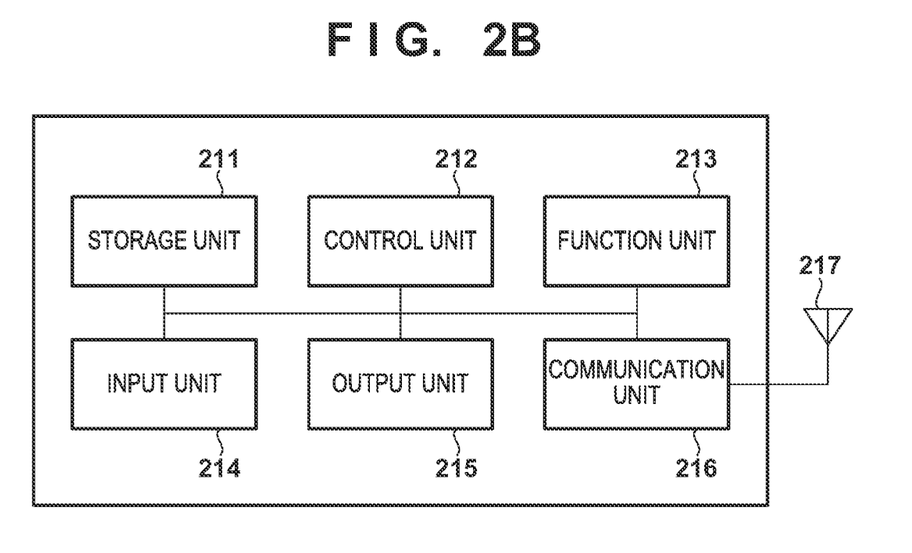
FIG. 2B is an example of the hardware arrangement of the NAN device.

Next, the arrangement of the NAN devices 101 to 104 and 106 will be described with reference to FIGS. 2A and 2B. FIGS. 2A and 2B are an example of the functional arrangement and an example of the hardware arrangement, respectively, of NAN devices (NAN devices 101 to 104 and 106) according to this embodiment.

The functional arrangement of each NAN device will be described first. In FIG. 2A, a wireless LAN control unit 201 performs wireless LAN control with another apparatus in compliance with the IEEE (Institute of Electrical and Electronic Engineers) 802.11 series. A NAN control unit 202 performs control in accordance with the NAN standard. For example, the NAN control unit 202 performs control for communicating a message in accordance with the NAN standard by controlling the wireless LAN control unit 201. Also, in a case in which the NAN device is to function as a proxy client (client apparatus), the NAN control unit 202 will transmit a service registration request and perform control for transmitting a publisher list request. In addition, in a case in which the NAN is to function as a proxy server (server apparatus), the NAN control unit 202 receives a service registration request and performs control for transmitting a publisher list. Note that the service registration request and the publisher list will be described later.

A message analyzing unit 203 analyzes a received message. For example, the message analyzing unit 203 analyzes a received message to confirm whether predetermined information is included in the received message and to confirm the transmission source of the received message. A memory control unit 204 controls a storage unit 211 (FIG. 2B). For example, the memory control unit 204 will determine (select) the information to be included in the publisher list by confirming whether predetermined information is stored in the storage unit 211 and based on the analysis/confirmation result by the message analyzing unit 203, and stores the determined information in the storage unit 211. The message analyzing unit 203 and the memory control unit 204 will function when the NAN device is to function as a proxy server.

The hardware arrangement of each NAN device will be described next. In FIG. 2B, the storage unit 211 is formed from a memory such as a ROM (Read Only Memory), a RAM (Random Access Memory), or the like, and stores programs for performing the operation of each cycle (to be described later) and various kinds of information such as communication parameters for wireless communication and the like. Note that other than a memory such as a ROM, a RAM, or the like, a flexible disk, a hard disk, an optical disk, a magneto-optical disk, a CD-ROM, a CD-R, a magnetic tape, a nonvolatile memory card, a DVD, or the like may be used as the storage unit 211. The storage unit 211 may also include a plurality of memories.

A control unit 212 is formed from a processor such as a CPU (Central Processing Unit), an MPU (Micro Processing Unit), or the like, and controls the entire NAN device by executing a program stored in the storage unit 211. In addition, it may be set so that the control unit 212 includes a plurality of processors such as a multi-core, and controls the NAN device overall by using a plurality of processors.

The control unit 212 also controls a function unit 213 to execute predetermined processing such as image capturing, printing, image projection, or the like. The function unit 213 is the hardware for the NAN device to execute the predetermined processing. For example, if the NAN device is to function as a camera, the function unit 213 will execute image capturing processing as an image capturing unit. In addition, if the NAN device is to function as a printer, the function unit 213 will execute print processing as a printing unit. Furthermore, for example, if the NAN device is to function as a projector, the function unit 213 will execute image projection processing as an image projection unit. The data to be used for the function unit 213 to perform processing may be data stored in the storage unit 211 or data communicated from another communication apparatus such as another NAN device via a communication unit 216 (to be described later).

An input unit 214 accepts various operations made by a user. An output unit 215 makes various kinds of outputs to the user. An output made by the output unit 215 in this case includes at least one of a display on a screen, an audio output by a loudspeaker, a vibration output, and the like. Note that the input unit 214 and the output unit 215 can be implemented together as a single module in the manner of a touch panel. In a case in which an output is to be performed by a display operation, the output unit 215 will be formed by, for example, an LCD (Liquid Crystal Display) and an LED (Light-Emitting Diode), output information that is visually recognizable by the user, and perform display control on various kinds of UIs (User Interfaces).

The communication unit 216 is formed from a chip for executing communication in compliance with the IEEE802.11 series, and performs wireless communication control and IP (Internet Protocol) communication control. The communication unit 216 also controls an antenna 217 to transmit/receive wireless signals for wireless communication. The NAN device can obtain content such as image data, document data, video data, or the like by communicating with another communication apparatus such as another NAN device via the communication unit 216. Note that in a DW period in which wireless signals are not transmitted/received, the control unit 212 will control the NAN device so power will not be supplied to the communication unit 216 (that is, the NAN device will be set to a sleep state/DOZE state in this case).

A few limited embodiments including the procedure of processing executed by the NAN devices 101 to 104 and 106 described above will be described next hereinafter.

First Embodiment

This embodiment will describe an example in which a NAN device 101 searches for a service as a proxy of a NAN device 102, summarizes the result as a publisher list, and notifies the NAN device 102 of the publisher list.

To describe this embodiment, it is assumed that the NAN device 101 is capable of discovering peripheral NAN devices and the services provided by these devices and providing information of services that can be provided from itself based on the NAN standard. In addition, it is assumed that the NAN device 101 functions as a proxy server that can act as a proxy of another NAN device to search for or perform notification of a service. It is assumed also that the NAN device 101 participates in a NAN cluster 105 in the role of a master and participates in a NAN cluster 107 in the role of a master.

Assume that the NAN device 102 has the role of a non-master non-sync and searches for a predetermined service such as, for example, a printer service. Assume also that the NAN device 102 functions as a proxy client and can make a proxy service search to a proxy server when the proxy server is discovered. In a case in which the NAN device 102 itself is searching for a service, that is, in a case in which it has not made a proxy request, assume that wireless signals will be received in all of the DW periods. On the other hand, assume that the NAN device 102 will receive wireless signals in only DW0 and DW3 in a case in which it has made a proxy request.

Assume that NAN devices 103, 104, and 106 are publishers that are capable of providing the printer service searched for by the NAN device 102. Assume that the NAN device 103 will perform service notification at DW1 and DW2 in the NAN cluster 105. Assume that the NAN device 104 will perform service notification at DW2 in the NAN cluster 105. Assume that the NAN device 106 participates in the NAN cluster 107 separate from that of the NAN devices 102 to 104 and performs service notification at DW2 in the NAN cluster 107.

Figure 3A:
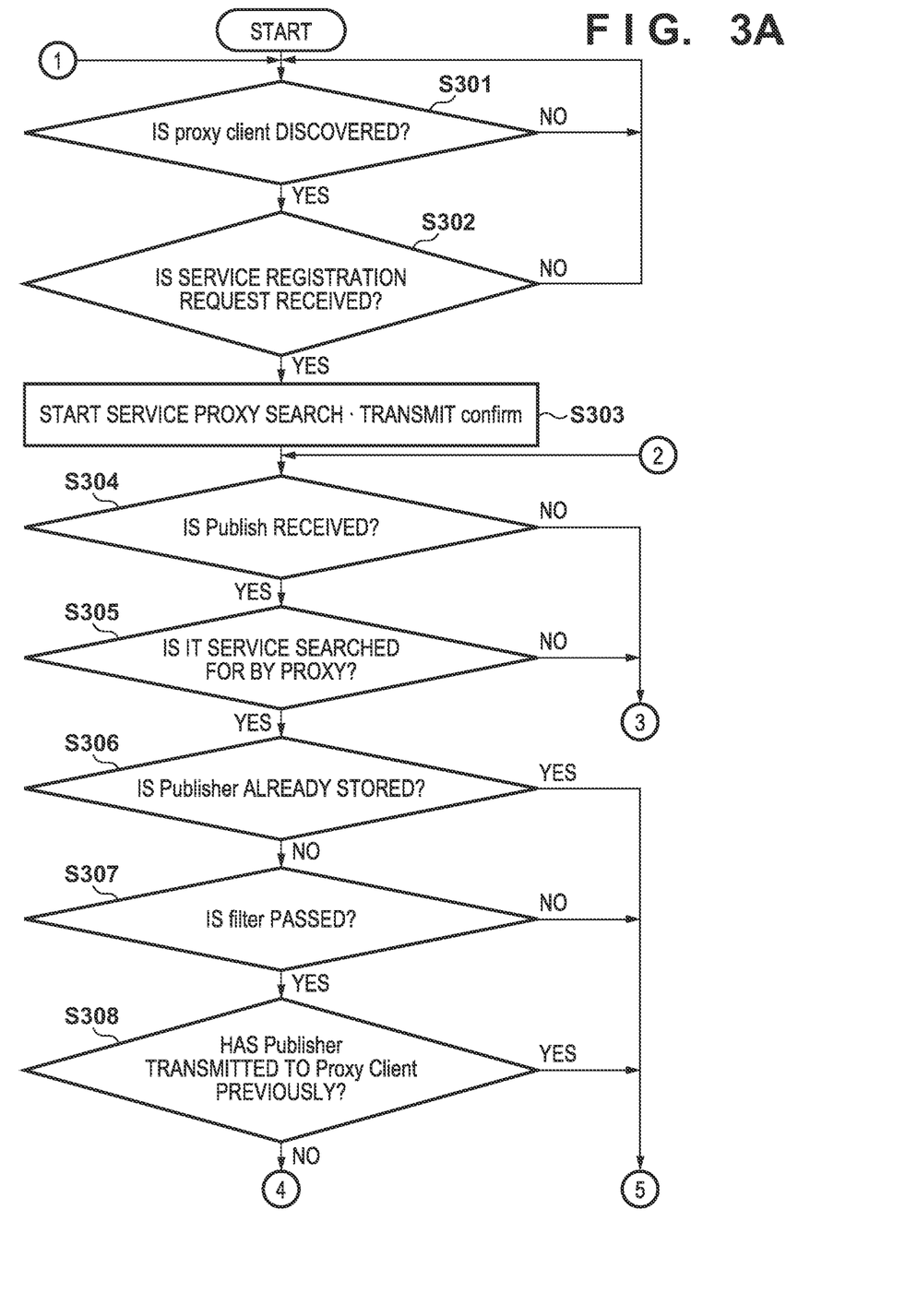
FIG. 3A is a flowchart (1) showing an operation of a NAN device 101.
Figure 3B:
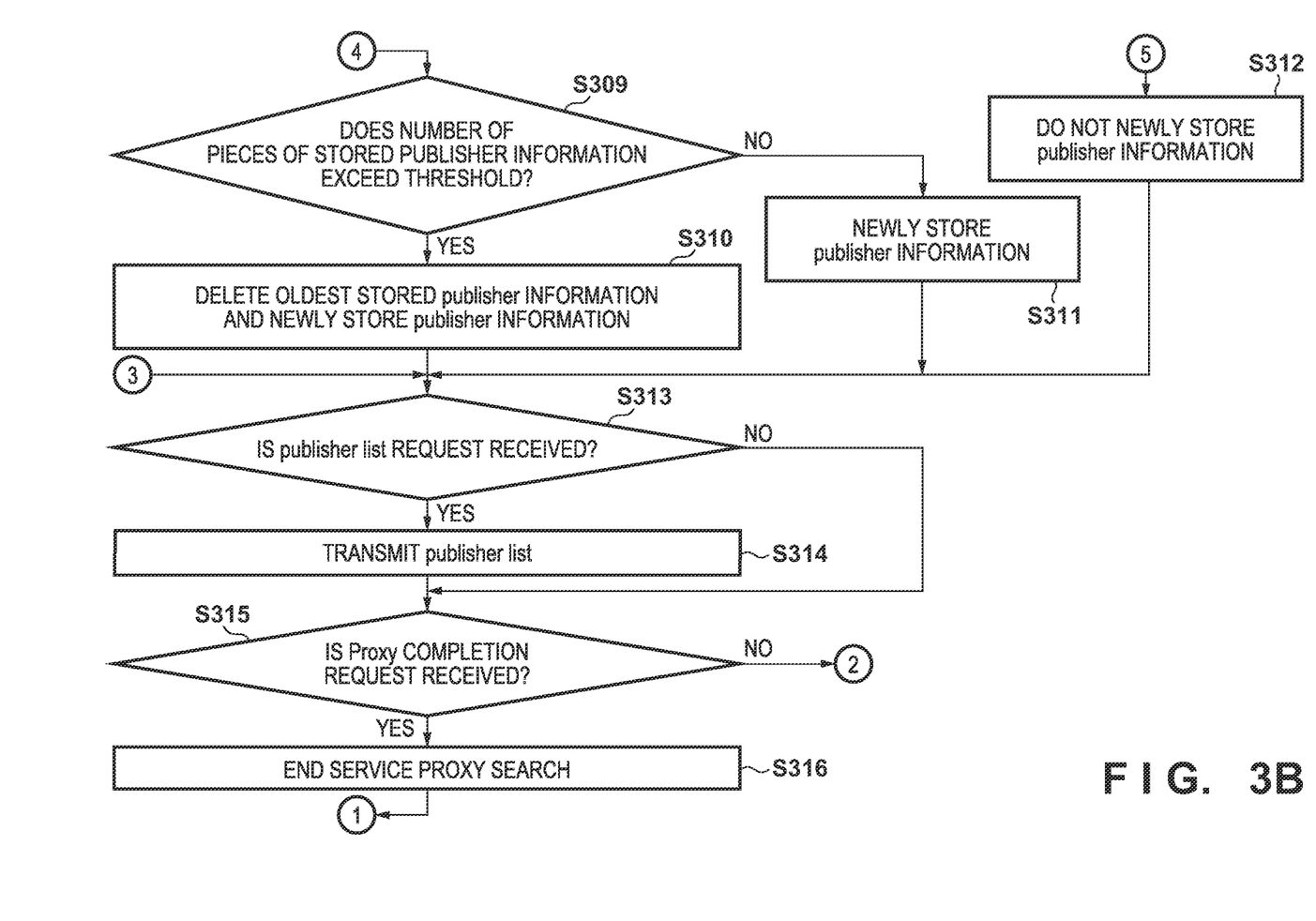
FIG. 3B is a flowchart (2) showing the operation of the NAN device 101.

The operation of the NAN device 101 which performs a service search as a proxy to the NAN device 102 operating as a proxy client and a subscriber will be described next with reference to FIGS. 3A and 3B. FIGS. 3A and 3B are flowcharts showing the operation of the NAN device 101. The flowchart of FIG. 3A starts at the point at which the NAN device 101 participates in the NAN cluster and starts operating as a proxy server. Assume also that a storage unit 211 of the NAN device 101 that operates as the proxy server includes a transmission preparation portion for storing publisher information based on a publish message when the publish message is received. The publish message incudes information for identifying the publisher and the information of the service.

Note that the flowcharts shown in FIGS. 3A and 3B are executed when a control unit 212 of the NAN device 101 executes an arithmetic processing operation and processing on the information and hardware control by executing a control program which is stored in the storage unit 211 and implements the functions shown in FIG. 2A. Note that it may be arranged so that some or all of the steps illustrated in the flowcharts shown in FIGS. 3A and 3B are implemented by, for example, hardware such as ASIC or the like.

The NAN device 101 that operates as the proxy server will use a publish message to notify its periphery of a proxy server operation capability as a proxy service. Another method may be employed as the proxy server operation capability notification method. For example, the NAN device 101 may include the information that proxy operation is possible in a sync beacon to be transmitted. In addition, the NAN device 101 may start operating as a proxy server after receiving information from a peripheral NAN device that the peripheral NAN device will operate as a proxy client.

Upon discovering a proxy client (YES in step S301), the NAN device 101 stands by until a request (registration request) for registering a service to be searched by proxy is received from the proxy client (step S302). Note that the process of step S301 may be omitted. When a registration request is received from the NAN device 102 via a communication unit 216 (YES in step S302), the NAN device 101 starts the service proxy search and transmits "confirm" to the transmitter (that is, the NAN device 102) of the registration request (step S303). As the process of step S303, for example, a NAN control unit 202 of the NAN device 101 will periodically transmit a service search frame (subscribe message) of the service to be searched by proxy via the communication unit 216. Note that for the purpose of power saving, the NAN device 101 may just stand by to receive a publish message from a publisher without transmitting a subscribe message.

When a publish message is received from the publisher in this state (YES in step S304), the NAN device 101 confirms whether the information (for example, a name) of the service included in the received publish message matches the information of the service searched for by proxy (step S305). A message analyzing unit 203 of the NAN device 101 performs the process of step S305. If the information of the service included in the received publish message matches the information of the service searched for by proxy, that is, if the service that can be provided by the publisher is the service searched for by proxy (YES in step S305), the process advances to step S306. In step S306, the NAN device 101 confirms whether the information for identifying the publisher (to be referred to as a transmission source publisher hereinafter) which is the transmission source of the publish message received in step S304 is stored in the transmission preparation portion of the storage unit 211. A memory control unit 204 of the NAN device 101 performs the process of step S307.

If it is determined that the information for identifying the transmission source publisher is not stored in the transmission preparation portion of the storage unit 211 (NO in step S306), the NAN device 101 makes the received publish message pass a predetermined filter (step S307). This processing corresponds to processing for determining whether the received publish message matches predetermined filtering conditions defined by the NAN device 102. The message analyzing unit 203 performs the process of step S307. In this embodiment, a matching filter and/or a service response filter is used as an example of the predetermined filter. Note that these filters are defined by the NAN standard.

A matching filter is a filter formed by series-connecting a plurality of sets of lengths and values. When a subscriber receives a publish message, a determination is made to allow the message to pass if a reception matching filter held by the subscriber includes the sets of lengths and values described in a transmission matching that can be read from the received publish message. On the other hand, when a publisher receives a subscribe message, a determination will be made to allow the message to pass if the reception matching filter held by the publisher is included in the sets of lengths and values described in the transmission matching filter that can be read from the received subscribe message. In addition, the service response filter is a filter based on a Mac address.

The reception matching filter and/or the service response filter can be included in the registration request received by the NAN device 101 from the NAN device 102 in step S302. The NAN device 101 will perform filtering by using the reception matching filter obtained from the NAN device 102 if the transmission matching filter is included in the publish message received by proxy. In addition, if the service response filter is included in the publish message received by proxy, the NAN device 101 will perform filtering based on the Mac address of the NAN device 102. Note that in a case in which the filters are not included in the publish message, the NAN device 101 may determine that this message has passed the filters.

When the message has passed the filter (YES in step S307), the NAN device 101 confirms, from the storage unit 211, whether the transmission source publisher is a partner that has previously transmitted information to the NAN device 102 (step S308). That is, the NAN device 101 confirms whether the transmission source publisher is a NAN device already known by the NAN device 102. The memory control unit 204 of the NAN device 101 performs the process of step S308.

If the transmission source partner is not a partner that has previously transmitted information to the NAN device 102 (NO in step S308), the NAN device 101 confirms whether the number of pieces of publisher information registered in the transmission preparation portion of the storage unit 211 exceeds a predetermined number (for example, five) (step S309). If the registered number of pieces of publisher information exceeds the predetermined number (YES in step S309), pieces of publisher information that newly correspond to the transmission source publisher, excluding the piece of publisher information with the oldest publish message reception timing, out of the plurality of pieces of publisher information stored in the transmission preparation portion are stored in the transmission preparation portion of the storage unit 211 (step S310). If the registered number of pieces of publisher information is a predetermined number or less (NO in step S309), the NAN device 101 stores the pieces of publisher information that newly correspond to the transmission source publisher in the transmission preparation portion of the storage unit 211 (step S311). The memory control unit 204 performs the processes of steps S310 and S311.

As a modification of step S310, the NAN device 101 can delete the publisher information corresponding to the publisher that has the smallest master preference value. Master preference is a value that can be freely set in each NAN device to determine the possibility of the device operating in the role of a master. As a result, the publisher information corresponding to a publisher with a high master preference value will be registered, and it becomes possible for the NAN device 102 to select a more stable publisher.

Furthermore, as another modification of step S310, in a case in which the NAN device 101 knows the positional relationship of publisher and the proxy client, the NAN device 101 can delete the publisher information corresponding to the publisher farthest from the proxy client. The positional relationship can be obtained by, for example, the NAN control unit 202 based on the signal level of the received signal. This can prevent the occurrence of communication difficulties between the proxy client and a publisher (a publisher set as a candidate) corresponding to the publisher stored in the transmission preparation portion of the storage unit 211 of the NAN device 101.

If the determination results of step S306 is "YES", the determination result of step S307 is "NO", and the determination result of step S308 is "YES", the process advances to step S312, and the NAN device 101 causes the process to advance to step S313 without newly storing the publisher information corresponding to the transmission source publisher in the storage unit 211.

Note that each of the processes of steps S306 to S309 is independent, and the order of the processes may be switched or it may be set so that one of the processes will be performed. That is, for example, it may be set so that, for example, the NAN device 101 will confirm only whether the transmission source publisher is already stored in step S306 and not newly store the publisher information corresponding to the transmission source publisher if it is already stored or newly store the publisher information corresponding to the transmission source publisher if it is not already stored. In addition, if the NAN device 101 is in the close range of the proxy client, it may determine whether to newly store the publisher information corresponding to the transmission source publisher by using the radio field intensity of a publish message previously received from the publisher as a threshold. More specifically, the NAN control unit 202 of the NAN device 101 may set the radio field intensity of a publish message received previously from the publisher as a threshold (reference) and not register publisher information corresponding to a publisher that is the transmission source of a publish message which has a radio field intensity lower than the threshold.

Also, in a case in which the positional relationship of the publisher and the proxy client is known, the NAN device 101 can determine not to newly store the publisher if the distance between the publisher and the proxy client is equal to the threshold or more. As one example, the positional relationship can be obtained by the NAN control unit 202 as described above.

In addition, the NAN device 101 serving as a proxy server may store information only when it is known that the publisher is a secure partner. Hence, for example, the message analyzing unit 203 may analyze the received message and determine whether the transmission source publisher is secure (whether it indicates a security level higher than a predetermined level). As a result, the proxy client will be able to receive only secure partners as the search result.

Also, even in a case in which a publish message is received from the same publisher, the NAN device 101 may separately store the information if a part of the internal information is different such as a case in which a different filter is used. As a result, it becomes possible to cope with a case in which the conditions are different even when the publisher is the same device. Particularly, in a case in which a different filter is used, the NAN device 101 may prioritize and store information whose filter condition allows a greater number of devices to pass. As a result, it becomes possible to notify the proxy client of a greater number of publisher candidates. The processes of steps S304 to S312 will be referred as filtering processing hereinafter.

In step S313, if the NAN device receives a publisher list request (a list of publisher information) from the proxy client (YES in step S313), the NAN control unit 202 will generate a publisher list from the pieces of publisher information stored in the transmission preparation portion of the storage unit 211 and transmit the generated list to the proxy client via the communication unit 216 (step S314). The NAN device 101 can transmit the publisher list within the DW in which it received the publisher list request or in the DW designated in the publisher list request.

Figure 5:
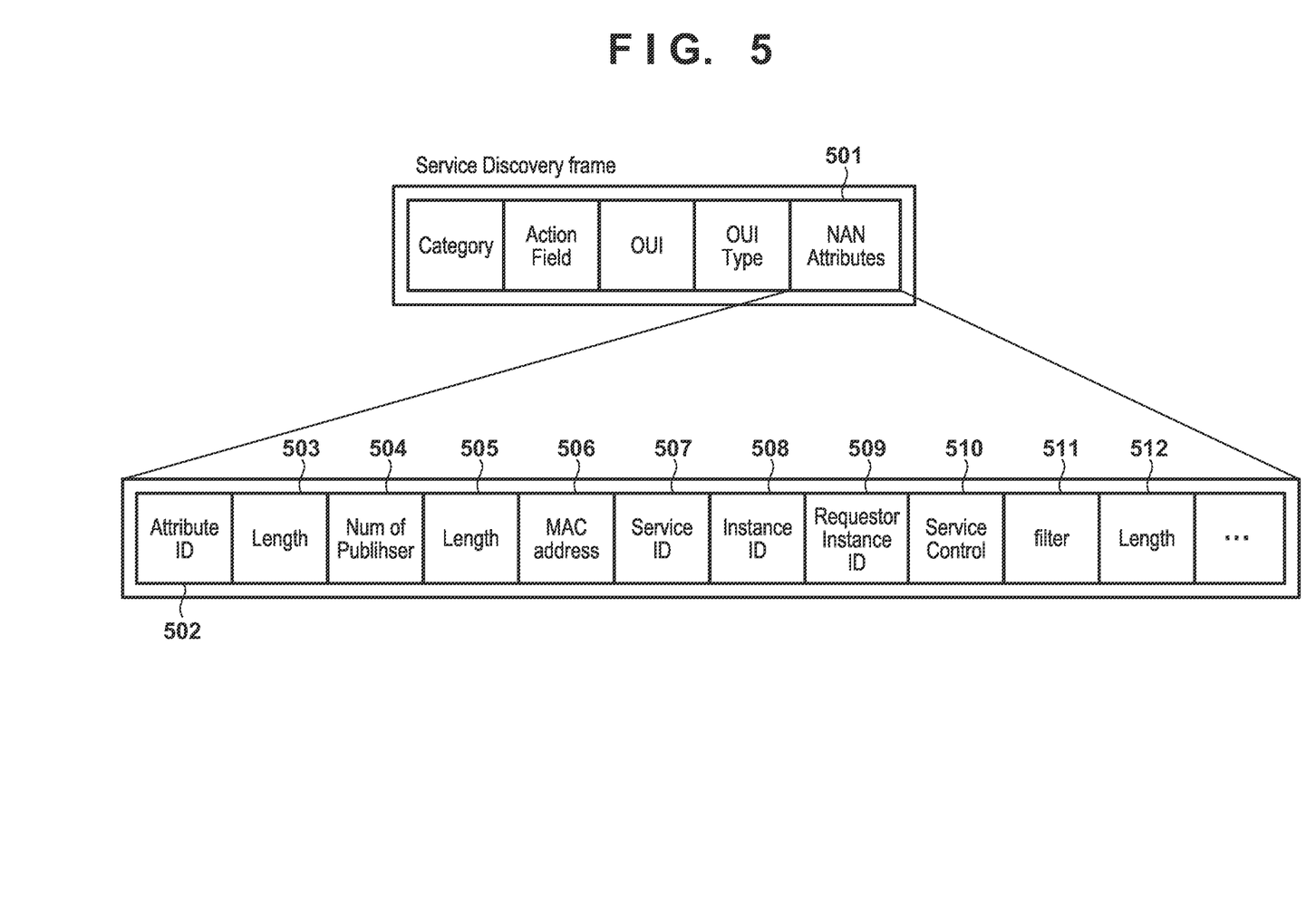
FIG. 5 shows an example of the configuration of a frame of a Publisher List.

FIG. 5 shows an example of the configuration of a publisher list frame as an SDF (Service Discovery Frame) to be transmitted to the proxy client. The SDF uses a publish action frame in compliance with the IEEE802.11 standard. The SDF includes a NAN Attribute (501) for including information defined by the NAN in a part of the publish action frame. 0×16 indicating that it is a publisher list attribute is input to an Attribute ID (502). Note that this value may be another value. The number of pieces of publisher information included in the SDF is input to a Num of Publisher (504). If the SDF does not include the publisher information, this value will be transmitted as 0 to the proxy client.

A Length (505) and a filter (511) correspond to one piece of publisher information. The length of one piece of publisher information is input to the Length (505). The Mac address of the transmission source publisher is input to a Mac address (506) as information for identifying the transmission source publisher. Information included in the publish message is input intact from a service ID (507) to the filter (511). Subsequently (512 and after), input of each piece of publisher information is continued in the same manner as 505 to 511.

Note that the frame configuration shown in FIG. 5 is merely an example, and another configuration may be set. For example, if filtering has been performed in S07, the NAN device 101 may transmit the frame in a form in which the filter (511) has been removed. As a result, it is possible to remove wasteful pieces of information from the pieces of information to be transmitted. Also, a NAN attribute may be added other than the information shown in FIG. 5. As a result, the NAN device 101 will be able to transmit information related to a proxy other than those on the publisher list to the proxy client.

Next, when a proxy registration completion request is received from the proxy client in step S315 (YES in step S315), the NAN device 101 ends the service proxy search of the target proxy client (step S316). The NAN control unit 202 performs the processes of steps S315 and S316. Note that since each of the processes of steps S304, S313, and S315 is an independent process, the order of these processing steps may be switched or these processing steps may be performed simultaneously.

Figure 4:
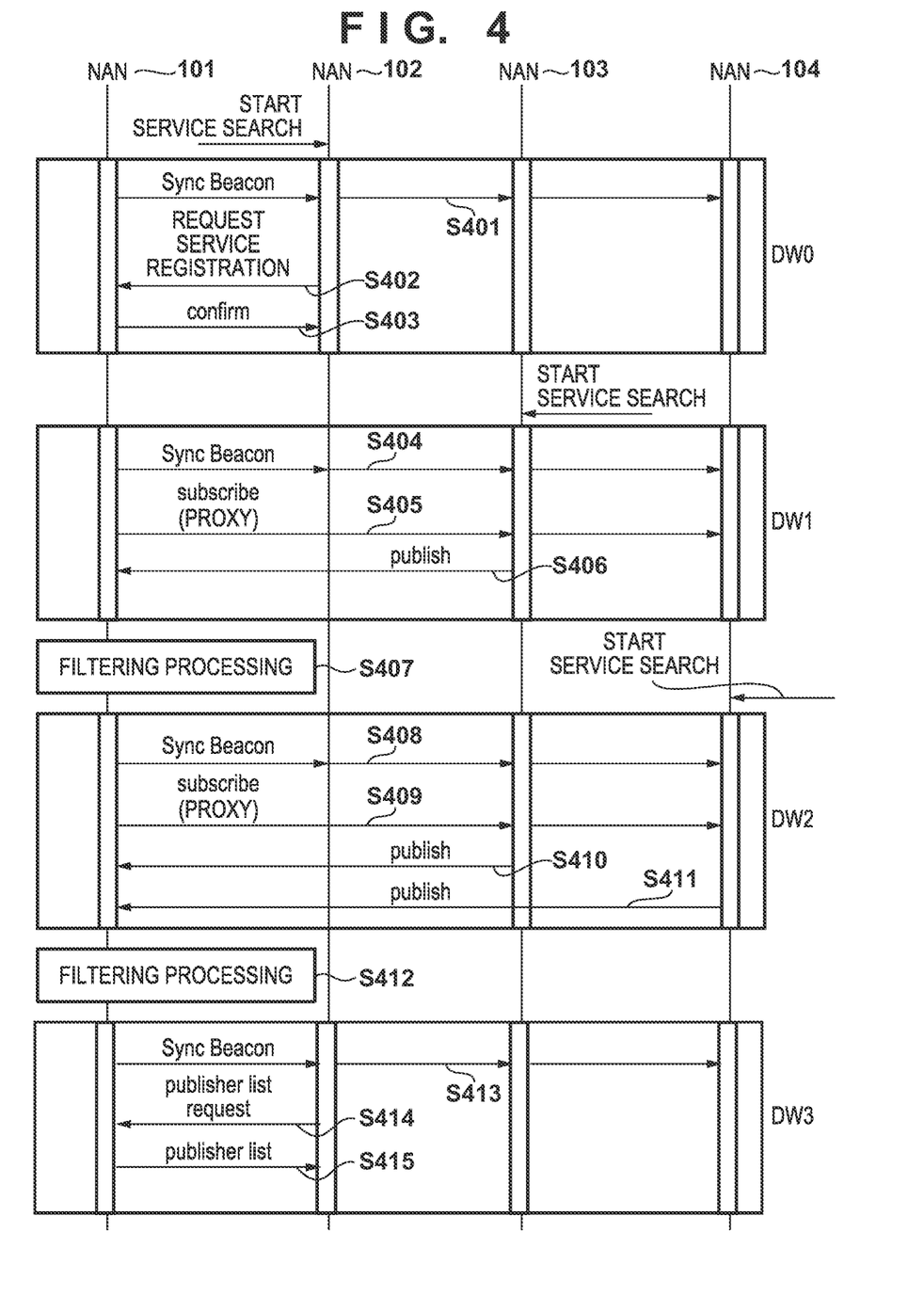
FIG. 4 is a chart showing an exemplary sequence of a communication system according to the first embodiment.

The operation performed from the registration of a subscribe message to the NAN device 101 by the NAN device 102 operating as the subscriber and the proxy client until the reception of a publisher list will be described next with reference to FIG. 4. FIG. 4 is an exemplary sequence chart of a system according to this embodiment.

In FIG. 4, assume that the NAN device 102 will be in the awake state in DW0 and DW3 and will be in the sleep state in other periods. Assume that the NAN devices 101, 103, and 104 will be in the awake state in all of the DW periods and will be in the sleep state in other periods. Assume that each of the NAN devices 103 and 104 is a publisher which is a device capable of providing the printer service searched for by the NAN device 102. Assume that the NAN device 103 transmits a publish message in DW1 and DW2, and the NAN device 104 transmits a publish message in DW2.

The NAN device 101 operating in the role of the master transmits a sync beacon which is beacon for performing synchronization in each DW (S401, S404, S408, and S413). The NAN device 102 starts the service search. In DW0, the NAN device 102 confirms that the NAN device 101 operating as the proxy server is present nearby and transmits a service registration request (S402). Upon receiving the service registration request, the NAN device 101 starts the preparation for the proxy search and transmits "confirm" to the NAN device 102 (S403).

Next, the NAN device 103 starts the service search. In DW1, the NAN device 101 as a proxy transmits a subscribe message (S405). Upon receiving the subscribe message, the NAN device 103 transmits a publish message (S406). The NAN device 101 performs filtering processing on the publish message received in DW1 in accordance with the procedure in the flowcharts shown in FIGS. 3A and 3B (S407). As a result of the filtering processing, the NAN device 101 stores the publisher information corresponding to the NAN device 103 in the storage unit 211.

The NAN device 104 starts the service search next. In DW2, the NAN device 101 as a proxy transmits a subscribe message (S409). Upon receiving the message, the NAN devices 103 and 104 each transmit a publish message (S410, S411). The NAN device 101 performs filtering processing on each publish message received in DW2 in accordance with the procedure of the flowcharts shown in FIGS. 3A and 3B (S412). Since the publisher information corresponding to the NAN device 103 is already stored in the storage unit 211, the NAN device 101 does not newly store the publisher information. In addition, as a result of the filtering processing, the NAN device 101 determines not to newly store the publisher information corresponding to the NAN device 104.

Subsequently, in DW3, the NAN device 102 transmits a publisher list request message (S414). Upon receiving this message, the NAN device 101 transmits the publisher list (see FIG. 5) to the NAN device 102 (S415). Although this publisher list includes the publisher information corresponding to the NAN device 103, it does not include the publisher information corresponding to the NAN device 104.

In this manner, by filtering the search targets when the NAN device 101 is to search for a service by proxy, it is possible to reduce the number of pieces of information related to the publisher to be transmitted by the NAN device 101. A device that serves as a proxy client is generally a device, such as a smartphone or the like, whose power consumption needs to be suppressed as much as possible. Since the proxy client will receive an information notification that has already been filtered, the amount of computation to be performed by the proxy client is reduced, and the power consumption of the proxy client pc can be suppressed.

Note that although the NAN device 101 performed filtering by targeting only a publish message from a NAN device participating in the same NAN cluster in the sequence described above, the present invention is not limited to this. For example, the NAN device 101 can filter a publish message from a NAN device participating in another NAN cluster.

Figure 6:
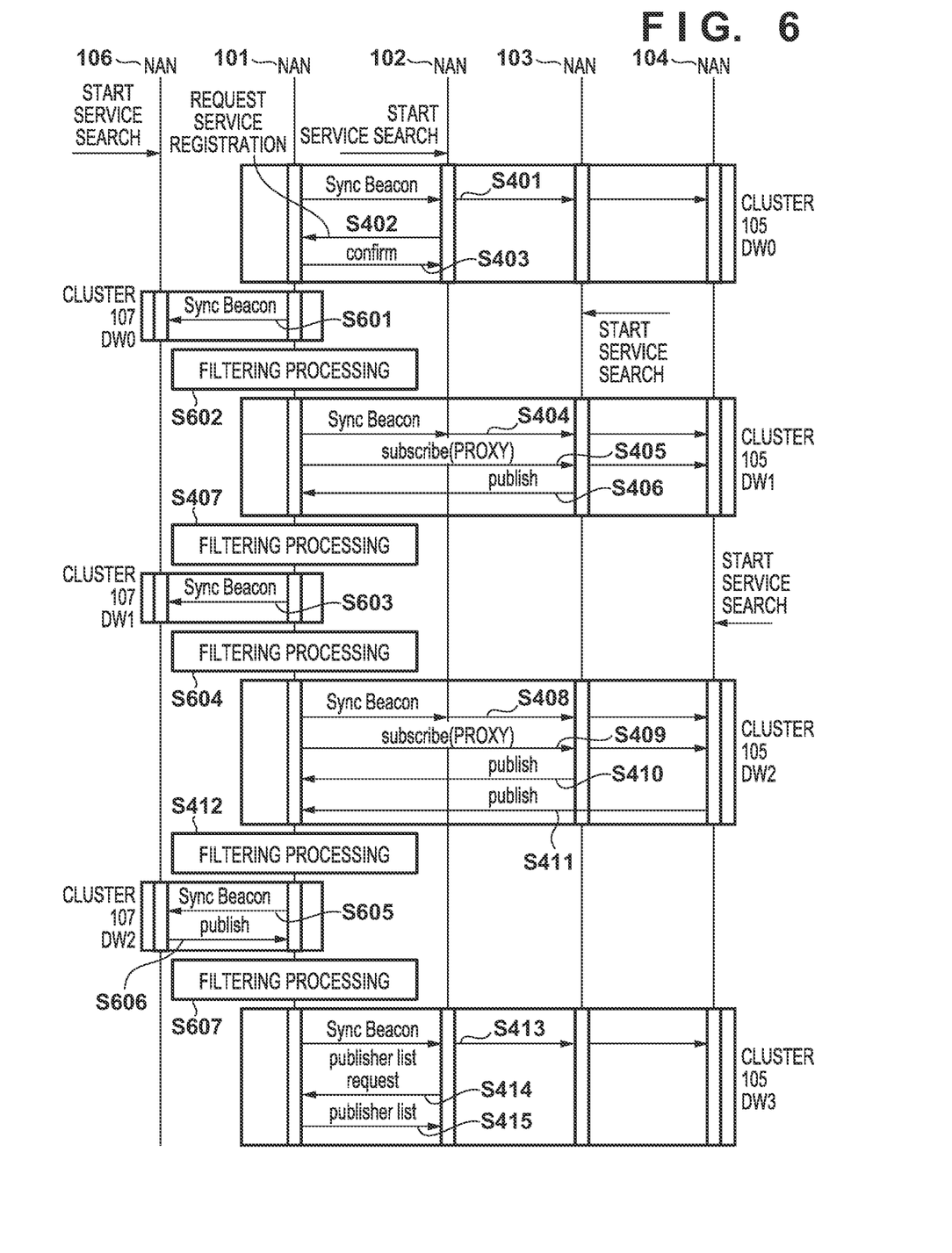
FIG. 6 is a chart showing another exemplary sequence of the communication system according to the first embodiment.

FIG. 6 is another exemplary sequence chart of a system according to this embodiment. In the sequence of FIG. 6, the NAN device 101 also filters the publish message from a NAN device participating in the NAN cluster 107 which is different from the NAN cluster 105 to which the NAN device 102 belongs. Assume that each of the NAN devices 103, 104, and 106 is a publisher which is a device capable of providing the printer service searched for by the NAN device 102. Points different from FIG. 4 will be described hereinafter.

The NAN device 106 transmits a publish message in DW2 of the cluster 107 which performs communication in the 5-GHz band (S606). The NAN device 101 performs filtering processing on the publish message received in DW2 of the cluster 107 (S607). At this time, if information related to usable frequency band is included in the publish message, whether the NAN device 102 can use the 5-GHz band or whether the NAN device 106 can execute communication in the 2.4-GHz band may be used as the reference of the filter. As a result, the NAN device 101 determines to store the publisher information corresponding to the NAN device 106 in the storage unit 211.

The publisher list transmitted in S415 also includes, other than the publisher information corresponding to the NAN device 103, the publisher information corresponding to the NAN device 106. As a result, the NAN device 102 can obtain information of a wider range of publishers. In addition, since the NAN device 101 will perform filtering processing even if the range has been increased, the amount of data to be included in the publisher list will not increase explosively.

Other Embodiments

In the embodiment described above, although the NAN device 102 is set to the awake state in DW0 and DW3, it may be set to the awake state in other DW periods. In addition, the embodiment described above described a case in which the NAN device 101 operates as a proxy server that performs a search by proxy in relation to a service search requested by the NAN device 102. However, information to be transmitted by proxy by the proxy function is not limited to the searched service information. For example, the NAN device 101 may accept a service provision notification transmitted from another device and perform notification of this service instead of this device. In this case, the NAN device 101 can perform, for example, a service search by transmitting the publish message of the other device by proxy and receiving a subscribe message or a follow-up message in response to this message. Note that the NAN device 101 may stand by for a subscribe message transmitted (voluntarily, for example) from yet another device without transmitting the publish message. In either case, the NAN device 101 can notify the device that requested the service search proxy operation of the search result in the DW period in which this device can receive a wireless signal.

Furthermore, the number of pieces of publisher information to be recorded in the publisher list is not limited to a specific number. The publisher list need not also be transmitted only once. For example, the publisher list may be divided into three parts each and transmitted over two times. As a result, it becomes possible to transmit many types of candidates that have a high possibility of communication while avoiding an overlap. In addition, although the NAN device 101 accepted a proxy request from the NAN device 102 in the embodiment described above, it may accept proxy requests from one or more other NAN devices.

According to the present invention, it is possible to appropriately determine information to be transmitted to notify an apparatus which is to be requested to act as a proxy.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus compliant with a Neighbor Awareness Networking (NAN) standard, comprising:
one or more processors; and
one or more memories including instructions that, when executed by the one or more processors, cause the communication apparatus to:
receive a first request from a client apparatus, wherein the first request is a request used by the client apparatus to request the communication apparatus to perform proxy processing;
receive, from a plurality of other communication apparatuses in a predetermined period that comes at a predetermined interval, a signal for service provision notification on behalf of the client apparatus, in a case where the first request is received; and
hold, in a case where the signal is received, information related to another communication apparatus that is a transmitter of the signal until a second request is received from the client apparatus without transmitting the information related to the another communication apparatus to the client apparatus, wherein
in a case where first and second signals are received from the plurality of other communication apparatuses,
in a case where a transmitter of the first signal is a same as a transmitter of the second signal, notify, in response to the second request from the client apparatus and in the predetermined period, the client apparatus of the held information related to one of the transmitter of the first signal and the transmitter of the second signal; and
in a case where the transmitter of the first signal differs from the transmitter of the second signal, notify, in response to the second request from the client apparatus and in the predetermined period, the client apparatus of the held information related to the transmitter of the first signal and the held information related to the transmitter of the second signal.

2. The communication apparatus according to claim 1, wherein the communication apparatus stores,
in a memory, information related to at least one of the plurality of other communication apparatuses,
wherein in a case in which the information related to the another communication apparatus is already stored in the memory,
the communication apparatus does not redundantly notify the client apparatus of the already stored information related to the another communication apparatus.

3. The communication apparatus according to claim 1, wherein in a case in which the signal matches a predetermined filtering condition received from the client apparatus, the communication apparatus notifies the client apparatus of the information related to the another communication apparatus.

4. The communication apparatus according to claim 1, wherein in a case in which the client apparatus has already been notified of the information related to the another communication apparatus, the communication apparatus determines not to notify the client apparatus of the information related to the another communication apparatus.

5. The communication apparatus according to claim 1, wherein in a case in which the signal has a radio field intensity higher than a predetermined threshold, the communication apparatus notifies the client apparatus of the information related to the another communication apparatus.

6. The communication apparatus according to claim 1, wherein in a case in which the signal indicates a security level higher than a predetermined level, the communication apparatus notifies the client apparatus of the information related to the another communication apparatus.

7. The communication apparatus according to claim 1, wherein in a case in which the communication apparatus receives the signal at a first frequency band in the predetermined period and receives the signal at a second frequency band different from the first frequency band in another period that comes at another predetermined interval different from the predetermined interval, and which the signal indicates that communication is available at both the first frequency band and the second frequency band, the communication apparatus notifies the client apparatus of the information related to the another communication apparatus.

8. The communication apparatus according to claim 1, wherein the communication apparatus determines, based on the information related to the another communication apparatus, whether or not to notify the client apparatus of information related to the another communication apparatus.

9. The communication apparatus according to claim 1, wherein the predetermined period is a Discovery Window defined in the Neighbor Awareness Networking standard.

10. A control method of a communication apparatus compliant with a Neighbor Awareness Networking (NAN) standard, the method comprising:
receiving a first request from a client apparatus, wherein the first request is a request used by the client apparatus to request the communication apparatus to perform proxy processing;
receiving, from a plurality of other communication apparatuses in a predetermined period that comes at a predetermined interval, a signal for service provision notification on behalf of the client apparatus, in a case where the first request is received;
holding, in a case where the signal is received, information related to another communication apparatus that is a transmitter of the signal until a second request is received from the client apparatus without transmitting the information related to the another communication apparatus to the client apparatus;
in a case where first and second signals are received from the plurality of other communication apparatuses,
in a case where a transmitter of the first signal is a same as a transmitter of the second signal, notifying, in response to the second request from the client apparatus and in the predetermined period, the client apparatus of the held information related to one of the transmitter of the first signal and the transmitter of the second signal; and in a case where the transmitter of the first signal differs from the transmitter of the second signal, notifying, in response to the second request from the client apparatus and in the predetermined period, the client apparatus of the held information related to the transmitter of the first signal and the held information related to the transmitter of the second signal.

11. A non-transitory computer readable storage medium storing a computer program for controlling a computer to execute a control method of a communication apparatus compliant with a Neighbor Awareness Networking (NAN) standard, the method comprising:

receiving a first request from a client apparatus, wherein the first request is a request used by the client apparatus to request the communication apparatus to perform proxy processing;

receiving, from a plurality of other communication apparatuses in a predetermined period that comes at a predetermined interval, a signal for service provision notification on behalf of the client apparatus, in a case where the first request is received;

holding, in a case where the signal is received, information related to another communication apparatus that is a transmitter of the signal until a second request is received from the client apparatus without transmitting the information related to the another communication apparatus to the client apparatus;

in a case where first and second signals are received from the plurality of other communication apparatuses, in a case where a transmitter of the first signal is a same as a transmitter of the second signal, notifying, in response to the second request from the client apparatus and in the predetermined period, the client apparatus of the held information related to one of the transmitter of the first signal and the transmitter of the second signal; and in a case where the transmitter of the first signal differs from the transmitter of the second signal, notifying, in response to the second request from the client apparatus and in the predetermined period, the client apparatus of the held information related to the transmitter of the first signal and the held information related to the transmitter of the second signal.

* * * * *